(12) United States Patent
Uhman et al.

(10) Patent No.: US 12,553,884 B2
(45) Date of Patent: Feb. 17, 2026

(54) LATERAL FLOW TEST KITS

(71) Applicant: Gampak Ltd, Hyde (GB)

(72) Inventors: Michal Uhman, Ascot (GB); Felix Benjamin Reid, Crondall (GB); Thomas David Milnes, London (GB); Gavin John Scott, Poynton (GB)

(73) Assignee: Gampak Ltd, Hyde (GB)

( * ) Notice: Subject to any disclaimer, the term of this patent is extended or adjusted under 35 U.S.C. 154(b) by 754 days.

(21) Appl. No.: 17/887,009

(22) Filed: Aug. 12, 2022

(65) Prior Publication Data

US 2023/0341380 A1 Oct. 26, 2023

(30) Foreign Application Priority Data

Apr. 22, 2022 (GB) ...................................... 2205919

(51) Int. Cl.
  *G01N 33/52* (2006.01)
  *B01L 3/00* (2006.01)
(52) U.S. Cl.
  CPC .......... *G01N 33/521* (2013.01); *B01L 3/5023* (2013.01); *B01L 3/5029* (2013.01);
  (Continued)
(58) Field of Classification Search
  CPC ........... G01N 33/521; G01N 33/54366; G01N 33/558; B01L 3/5023; B01L 3/5029;
  (Continued)

(56) References Cited

U.S. PATENT DOCUMENTS 6,524,530 B1 * 2/2003 Igarashi ................... G01N 1/02
 435/304.2
9,091,680 B1 7/2015 Schreiber
(Continued)

FOREIGN PATENT DOCUMENTS

EP 1847321 A 10/2007
GB 2430032 A 3/2007
(Continued)

OTHER PUBLICATIONS

International Search Report for Application No. PCT/GB2023/051048, dated Jun. 12, 2023, 7 pages.
(Continued)

*Primary Examiner* — Benjamin R Whatley
(74) *Attorney, Agent, or Firm* — Dority & Manning, P.A.

(57) ABSTRACT

A lateral flow test kit includes a cassette and a swab. The cassette comprises a vial of liquid closed by seal; a test strip; a passage leading from the exterior of the cassette to the vial; and a conduit communicating between the vial and the test strip. The swab can be inserted along the passage to cause a tip of the swab to enter the vial and release liquid from the vial. The liquid flows past a head of the swab to extract a sample and deliver it through the conduit 34 to the test strip. The passage may comprise an obstruction, which requires the user to push the swab past it with a force sufficient to penetrate the seal. The obstruction may also prevent removal of the used swab from the cassette. A distal end of the passage may be curved to deflect the tip of the swab towards the seal at a more favourable angle.

22 Claims, 11 Drawing Sheets

(52) U.S. Cl.
CPC ... *B01L 2200/16* (2013.01); *B01L 2300/0672* (2013.01); *B01L 2300/069* (2013.01); *B01L 2300/0825* (2013.01); *B01L 2400/0683* (2013.01)

(58) Field of Classification Search
CPC ......... B01L 2200/16; B01L 2300/0672; B01L 2300/069; B01L 2400/0683; B01L 2300/0825; B01L 2200/025; B01L 2200/0689; B01L 2300/044; B01L 2300/0848
See application file for complete search history.

(56) References Cited

U.S. PATENT DOCUMENTS

| | | |
|---|---|---|
| 2004/0184954 A1 | 9/2004 | Guo et al. |
| 2007/0244368 A1 | 10/2007 | Bayloff et al. |
| 2010/0255609 A1 | 10/2010 | Rutter et al. |
| 2013/0065245 A1 | 3/2013 | Rutter et al. |
| 2013/0157381 A1 | 6/2013 | Pang et al. |
| 2013/0295573 A1* | 11/2013 | Carrera Fabra ....... B01L 3/5029 435/6.12 |
| 2014/0072960 A1* | 3/2014 | Lansing ............. G01N 33/5304 435/7.1 |
| 2017/0043336 A1 | 2/2017 | Khattak et al. |
| 2017/0080421 A1* | 3/2017 | Khattak ............. G01N 35/0098 |
| 2021/0291181 A1 | 9/2021 | Rothberg et al. |
| 2022/0003643 A1* | 1/2022 | Okamoto ......... G01N 35/00069 |

FOREIGN PATENT DOCUMENTS

| | | |
|---|---|---|
| GB | 2613213 A | 5/2023 |
| WO | WO03028889 A1 | 4/2003 |
| WO | WO 2014/164933 A1 | 10/2014 |

OTHER PUBLICATIONS

Combined Search and Examination Report for corresponding Application No. GB2305910.8 dated Oct. 18, 2023, 5 pages.
Combined Search and Examination Report for corresponding Application No. GB2305906.6, dated Oct. 24, 2023, 6 pages.
Combined Search and Examination Report for corresponding Application No. GB2305898.5, dated Oct. 24, 2023, 7 pages.
Combined Search and Examination Report for corresponding Application No. GB2305904.1 dated Oct. 24, 2023, 7 pages.

* cited by examiner

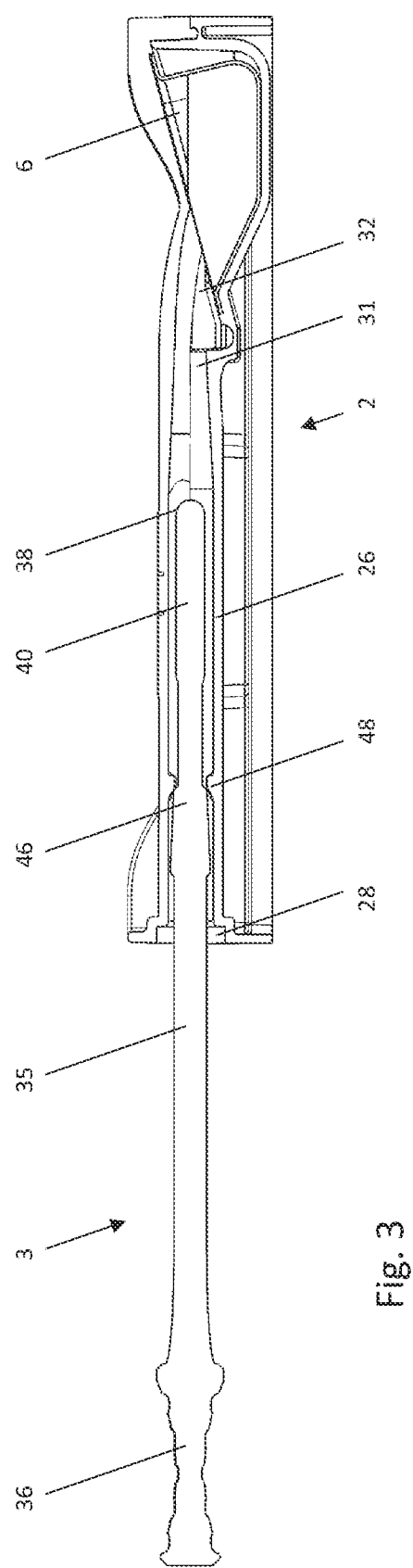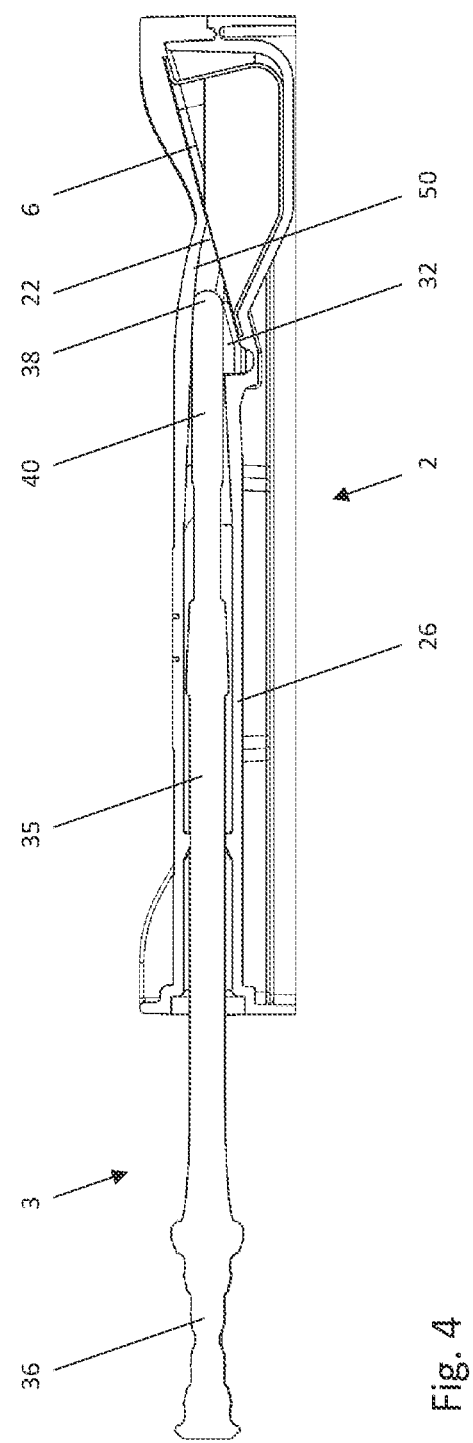

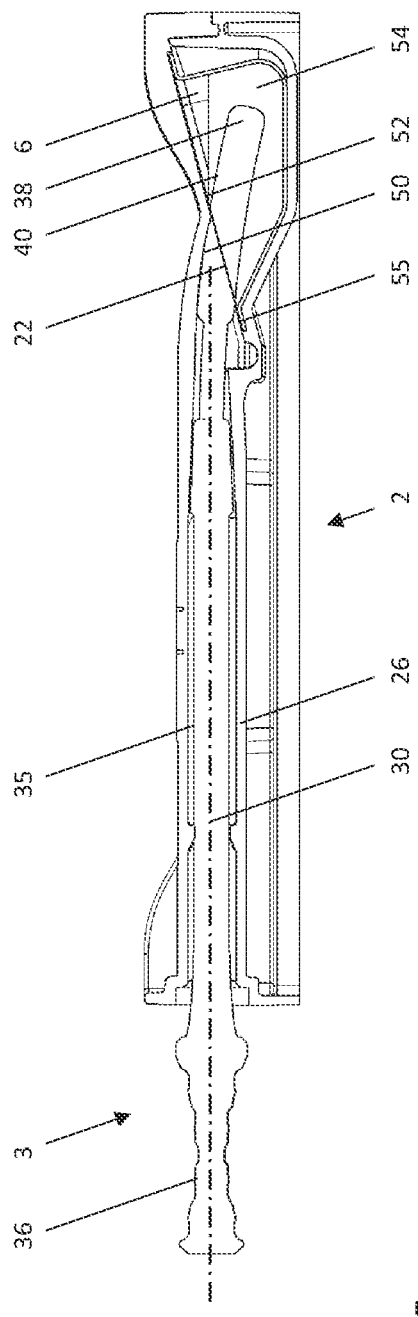

LATERAL FLOW TEST KITS

CROSS-REFERENCE TO RELATED APPLICATIONS

The present application is based upon and claims the right of priority to GB Patent Application No. 2205919.0, filed Apr. 22, 2022, the disclosure of which is hereby incorporated by reference herein in its entirety for all purposes.

FIELD OF THE INVENTION

The invention relates to lateral flow test kits, in which a sample in a liquid medium is applied to a test strip to carry out a chromatographic assay. It specifically relates to test kits in which the sample is obtained from a source on a swab and needs to be introduced to the liquid medium before being applied to the test strip.

The nature of the test strip itself does not form part of the present invention. It may be conventional or novel and may be used to detect the presence of any desired target such as a virus or other disease-causing agent, a hormone or an environmental contaminant. The source may be a human or animal subject or the swab may be used to collect samples from the environment.

DESCRIPTION OF RELATED ART

Lateral flow tests have been used for a long time, for example in pregnancy tests, but the scale of their use has increased enormously since the Covid-19 pandemic. A typical lateral flow test kit comprises a cassette containing the test strip; a swab for taking a sample from the nose and/or throat of a subject; a vial of liquid medium such as a buffer solution; and an extraction tube, in which the swab is agitated in the liquid to introduce the sample into the liquid, and from which a prescribed number of drops of the liquid are then squeezed into a well in the cassette to begin the test. In some known test kits, the vial doubles as the extraction tube.

For effective control of some diseases, it is important that a high percentage of the population should self-test regularly. The large number of components in typical lateral flow test kits requires a fairly complex sequence of steps to be followed to carry out a successful test, which may be off-putting for some sections of the population, e.g. those who are poor at reading instructions or are not manually dextrous. The complex sequence of manual steps may also result in a significant proportion of tests being carried out incorrectly, leading to invalid results. For example, it is possible that instead of delivering entire droplets of the liquid from the extraction tube into the well of the cassette, the user might inadvertently squeeze out air-filled bubbles, thereby applying an ineffective volume of the liquid to the test strip. Even if the invalid test is detected, for example because a control line on the test strip fails to appear, the user might not have time or inclination to repeat the test and might be dissuaded from carrying out further tests in future. Further, the handling of the components and the transfer of the liquid between them introduce possibilities for contamination of the sample if good practice is not followed while performing the test.

The typical test kits, with multiple steps and components, require a flat, clean surface on which the components can be arranged and successive steps of the test can be carried out, for example to squeeze drops of liquid from the extraction tube into a well. Such a surface might not always be available, especially if a test needs to be conducted outside a domestic setting.

To maintain sterility of the kit before use, each of the components is normally supplied in separate, single-use packaging, which leads to additional waste. Each of the components also needs to be disposed of hygienically after use.

In known test kits, the vial typically has the form of a relatively narrow and deep cone or cylinder, having a depth greater than its width. Because of this shape, such vials must be individually manufactured by injection moulding. Often, a filling operation is integrated into the moulding process, which adds further complexity.

It would be desirable to provide a lateral flow test kit that is improved in on or more of the following ways:
  The kit comprises a smaller number of distinct components at the point of use.
  The kit is simpler to use.
  The kit does not require a clear, flat surface on which to conduct a test.
  Tests performed using the kit have a higher proportion of valid results.
  Components of the kit are efficient to manufacture.

BRIEF SUMMARY OF THE INVENTION

The invention provides a lateral flow test kit as defined in claim 1.

The invention further provides a method of using a lateral flow test kit.

Features of the invention that are preferred but not essential are defined in the dependent claims.

In accordance with the invention, the vial of liquid is supplied as part of the cassette and remains within the cassette throughout the use of the test kit. The user does not need to remove a seal from the vial or transfer liquid from the vial to an extraction tube. The user also does not need to transfer the liquid from the extraction tube to the cassette. For these reasons, the sequence of steps to be followed by the user is simpler, the risk of error is lower and opportunities for contamination of the sample are avoided. There are not multiple components to be arranged on a surface and it may be possible to carry out the test while holding the cassette in one hand.

The smaller number of distinct components also results in less packaging, less waste and a simpler process for the supplier to assemble and distribute such test kits. In preferred embodiments of the invention, the swab is retained in the cassette after use, thereby further reducing the number of distinct components that need to be disposed of and decreasing the risk that the head of the swab may come into contact with the environment.

In some embodiments of the invention, the vial comprises a relatively shallow reservoir, having a depth less than its width, which is sealed by a planar film or foil. This shape lends itself to manufacture by cheaper methods than injection moulding, for example by flat-bed vacuum-forming an array of the reservoirs, which can then be filled simultaneously and sealed by a single foil sheet of foil before they are separated into discrete units.

In the present specification, terms such as "upper" and "lower" refer to the orientation of the cassette as shown in the drawings. In some embodiments of the invention the orientation may be important once the seal of the vial has been broken, to ensure that the liquid flows in the correct way to reach the test strip. However, test kits according to the present invention are generally less dependent than earlier test kits on being used in a specific orientation. It is understood that the cassette may be manufactured, stored and distributed in any orientation, at least after the vial has been sealed.

The term "proximal" refers to an end of the cassette through which the swab is inserted and the term "distal" refers to an opposite end of the cassette. The "longitudinal" direction extends between the proximal end and the distal end (in either direction). A "transverse" direction is one that is oblique or perpendicular to the longitudinal direction.

An "oblique" angle to a plane is one that is neither parallel to the plane nor perpendicular to the plane.

BRIEF DESCRIPTION OF THE DRAWINGS

FIGS. 3 to 6 are longitudinal cross-sections through the test kit of FIG. 1, showing successive stages in the insertion of the swab into the cassette.

DETAILED DESCRIPTION OF THE INVENTION

Figure 1:
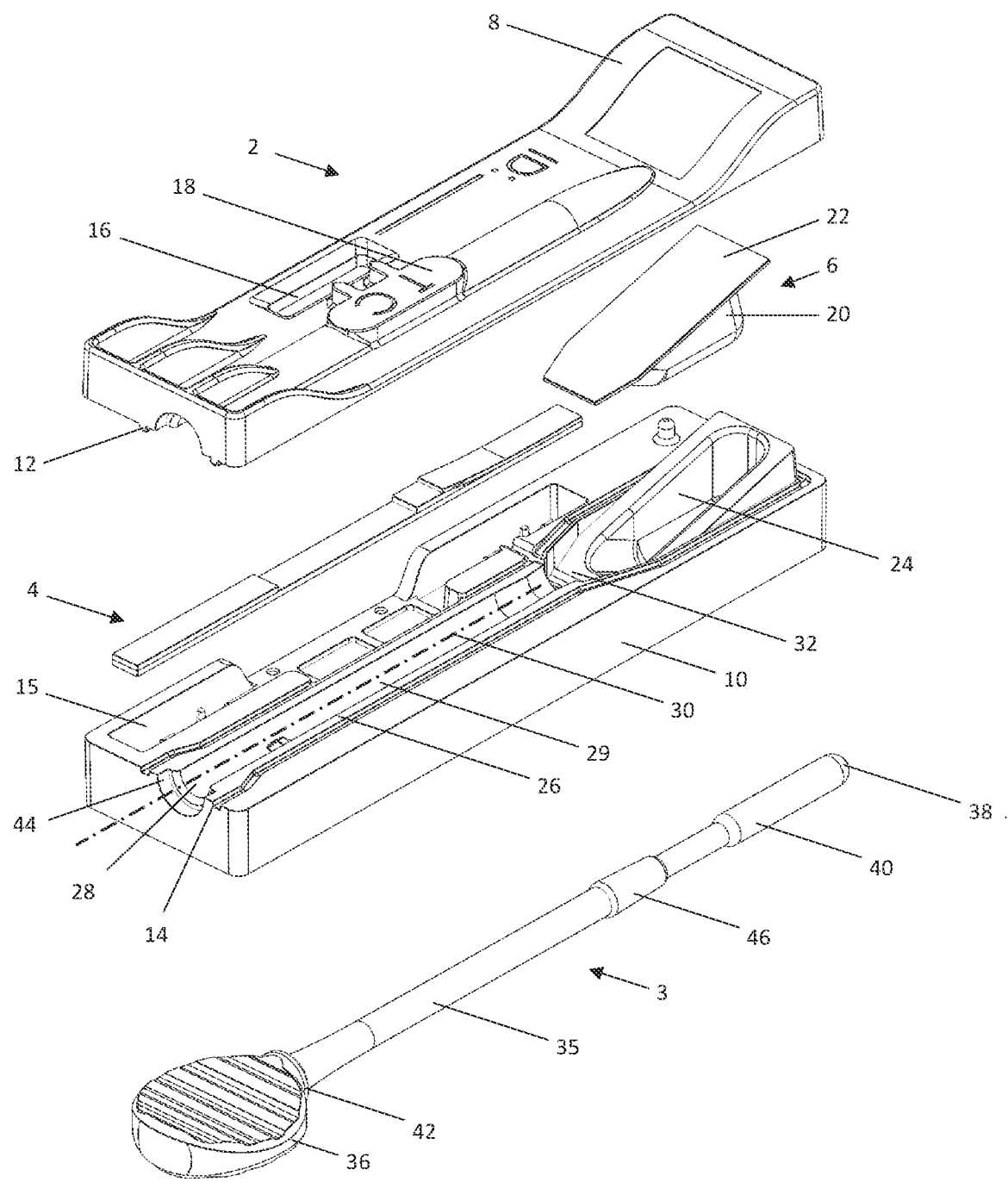
FIG. 1 is an exploded, perspective view of a test kit according to the invention.
Figure 2:
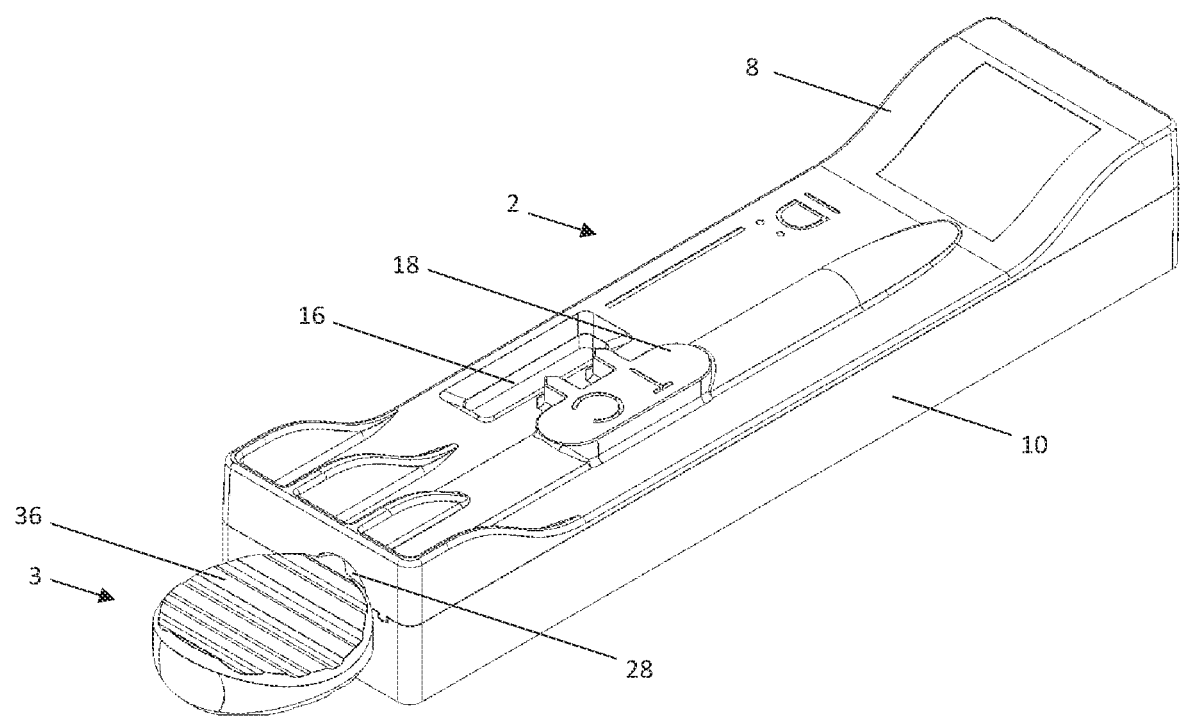
FIG. 2 is a perspective view of the test kit of FIG. 1, following assembly and insertion of the swab into the cassette.

FIGS. 1 to 10 illustrate a preferred embodiment of a test kit in accordance with the present invention. FIG. 1 shows in an exploded view the complete test kit (excluding packaging), which comprises a cassette 2 and a swab 3. FIG. 2 shows the test kit of FIG. 1 after assembly, with the swab 3 inserted into the cassette 2.

The cassette 2 is formed by assembling an upper half 8 with a lower half 10 to sandwich a test strip 4 and a vial 6 of a liquid buffer solution between the two halves. The upper and lower halves 8,10 are not intended to be separable by the user and may be clipped, press-fitted, adhered or welded together. The mutually facing surfaces of the upper and lower halves 8,10 may include complementary sealing features 12,14 to reduce leakage of the liquid from the cassette 2 during and after use.

The test strip 4 is securely mounted in a strip chamber 15, which is formed in the lower half 10 of the cassette 2 and closed by the upper half 8 during assembly. The mounting of the test strip 4 will be described in more detail below. It may be a conventional strip used for carrying out a chromatographic assay, typically comprising a strip of absorbent paper on which are deposited one or more transverse lines of a substance that responds to the presence of a target, for example an antigen that changes colour in the presence of a particular type of virus. A small quantity of liquid containing a sample to be tested is applied near one end of the strip and is transported along the strip by capillary action. Different components of the sample may be transported at different rates and, if a component triggers one of the deposited substances to respond, the colour change of the respective line will be visible through a window 16 in the upper half 8 of the cassette 2. In the illustrated embodiment, a label portion 18 on the upper half 8 includes a moulded letter "T" to mark the position of a test line that indicates the presence of a target in the sample; and a moulded letter "C" to mark the position of a control line, which indicates the successful completion of the test by showing that either the liquid itself or a component of it that is expected to be present in any valid sample has reached the position of the control line. The response of a line to the target is not necessarily a change in colour in the visible spectrum. For example, it could be a fluorescence that becomes visible in response to ultra-violet light or it could be the emission of other forms of radiation (e.g. by binding to radioactive particles in the sample) that can be detected with suitable sensors.

The vial 6 comprises a vial reservoir 20 that is closed by a seal which in this embodiment takes the form of a substantially planar film. In the illustrated embodiment, the vial 6 is a discrete component that is received in a vial chamber 24 in the cassette 2. This provides the advantage that the vial 6 may be manufactured and filled with liquid in a first process, then assembled into the cassette 2 in a second process as part of a standard assembly line. Thereby the assembly line does not need to handle uncontained liquids or be restricted to presenting the cassette in an orientation suitable for filling with the liquid. Vials 6 containing different liquids can be used without making any changes to the assembly line. However, it will readily be understood that in alternative embodiments of the invention, the vial chamber 24 itself could serve as the vial reservoir 20, to be filled directly with the liquid then closed by applying a seal 22 across the mouth of the chamber 24. The vial reservoir 20 is somewhat wedge-shaped, being deeper at the distal end than the proximal end, but nowhere having a depth greater than its length. Because of this relatively shallow profile and a planar upper rim that receives the seal 22, the form of the reservoir 20 lends itself to manufacture by vacuum forming.

The upper and lower halves 8,10 of the cassette 2 respectively define the upper and lower walls of a longitudinal passage 26. A proximal end of the passage 26 has a mouth 28 that opens to the exterior of the cassette 2. The passage 26 is substantially circular in cross-section and extends along a substantially straight portion 29 in the distal direction from the mouth 28. The centreline of the straight portion 29 defines an axis 30, which is generally parallel to the length of the test strip 4. The axis 30 is also parallel to a base of the cassette 2 so that when the cassette rests on a horizontal surface, the straight portion 29 of the passage 26 is orientated horizontally. A distal end of the passage 26 is adjacent to the vial chamber 24. The distal end of the passage 26 is oriented towards the seal 22 of a vial 6 located in the chamber 24, such that the tip 38 of a swab 3 pushed along the passage 26 with sufficient force will be directed to penetrate the seal 22 and enter the vial 6. In the embodiment of the invention illustrated in FIGS. 1 to 10, the distal end of the passage 26 narrows to a constriction 31 then widens and deepens to form a volume 32 adjacent to the vial chamber 24. Within the volume 32, a curved portion 50 of the upper wall of the passage 26 directs the tip 38 of the swab 3 towards the seal 22. A narrow conduit 34 extends transversely from the volume 32 to provide fluid communication between the distal end of the passage 26 and the distal end of the test strip 4.

A swab 3 forms part of the test kit and comprises a shaft 35 with a grip 36 at the proximal end and a tip 38 at the distal end. The shall 35 is able to flex resiliently, at least in a portion towards its distal end. The shaft comprises a head 40 at or adjacent to the tip 38. The head 40 may include the tip 38 and should be capable of at least partially entering the vial. The head 40 may comprise a roughened, flocked or absorbent material that is capable of picking up, retaining and then releasing a sample to be tested. The diameters of the shaft 35 and the head 40 are such that they can pass through the passage 26 but the grip 36 has a greater transverse dimension which forms a shoulder that prevents it from entering the passage mouth 28. The grip 36 may be provided with features such as a concave profile and a knurled texture to make it easier for a user to hold and manipulate the swab 3, both when obtaining a sample and when using the test kit to test the sample. The grip 36 may further be provided with a collar 42, which forms the said shoulder and can be fitted into a recess 44 around the mouth 28 of the passage 26 to close the mouth 28, preferably in a substantially liquid-tight manner. At an intermediate position along the shaft 35, it comprises an outward projection 46 in the general shape of a cone tapering towards the tip 38. The outward projection 46 of the swab 35 co-operates with wedge-shaped inward projections 48 at an intermediate position along the passage 26, as will be described below.

FIGS. 3 to 6 illustrate successive stages in the insertion of a swab 3 into the cassette 2.

In FIG. 3, the tip 38 and head 40 of the swab 3 have been inserted through the mouth 28 of the passage 26. The swab 3 initially slides easily along the passage 26, with the outward projection 46 on keeping the shaft 35 substantially centred. At an intermediate position, the outward projection 46 on the shaft 35 butts against the inward projections 48 formed on the upper and lower halves of the passage 26. The mutual engagement between the inward and outward projections 46,48 resists further movement of the swab 3 in the distal direction so that the user must apply increased longitudinal force to push the swab 3 past the projections 46,48. As soon as the mutual engagement of the projections 46,48 has been released, the increased force applied by the user causes the movement of the swab 3 to accelerate so that the tip now moves towards the distal end at higher speed.

In FIG. 4, the tip 38 of the swab 3 has reached the distal end of the passage 26. The tip 38 or the head 40 comes into contact with the curved upper wall 50 of the passage and the tip 38 comes into contact with the seal 22 that seals the vial 6.

As shown in FIG. 5, when the swab 3 continues to move in the distal direction at the higher speed that results from overcoming the mutual engagement of the projections 46,48, this causes the head 40 to be deflected downwards by the upper wall 50 and causes the tip 38 to pierce the seal 22 of the vial 6. The shape and rigidity of the tip 38 may be designed to facilitate this piercing, while minimizing the risk of injury to a user if the swab 3 is to be used, for example, to take a sample from their nose or throat.

Because of the shape of the vial 6 and the way it is mounted in the vial chamber 24, the substantially planar seal 22 is orientated at an oblique angle to the axis 30 of the straight portion of the passage 26. In some embodiments of the invention, the passage 26 may be straight along its entire length, such that the tip 38 always moves parallel to the axis 30 and penetrates the seal 22 at an oblique angle defined only by the orientation of the seal 22. In the present embodiment, the head 40 is deflected by the curvature of the upper wall 50 at the distal end of the passage 26, which results in the tip 38 penetrating the seal 22 at a steeper—but still oblique—angle defined by the orientation of the distal end with respect to the plane of the seal 22.

The "orientation of the distal end of the passage 26" means the direction in which the tip 38 is moving through the distal end as it penetrates the seal. The orientation may be defined more precisely by identifying the most distal point on the tip 38 of the swab 3 in its undeflected state; and the plane of the seal 22 prior to contact by the tip 38. The orientation of the distal end is then defined as the tangent to the path followed by that point, where the path crosses the plane of the seal 22. Any deflection of the tip 38 caused by contact with the seal 22 itself may be ignored so the relevant path is the one that the tip 38 would follow in the absence of a seal.

It has been found that, if the tip 38 approaches the seal 22 at too shallow an angle, it may fail to pierce the seal 22 and instead force its way between the seal 22 and the upper wall 52 of the vial chamber. On the other hand, if the tip 38 pierces the seal 22 at too steep an angle or perpendicularly, it can create a neat hole in the seal 22 that becomes filled by the head, thereby preventing liquid 54 from easily flowing out of the vial 6 through the hole. At intermediate, oblique angles, the tip 38 has been found to tear the seal 22 in a way that creates a larger opening, through which the liquid 54 can easily escape.

The seal 22 may be formed with lines of weakness to encourage it to tear in a desired pattern. Alternatively, instead of tearing under pressure from the tip 38 of the swab 3, the seal may be designed to detach from the rim 55 of the vial reservoir 20 so that liquid can escape from the vial 6 over the rim 55. The seal may be a thin, flexible foil or membrane. It should not be so resilient that it will stretch under pressure from the tip 38, rather than tearing or being pierced. In other embodiments of the invention (not illustrated) the seal 22 of the vial 6 may not be a film but may be a thin, rigid cover. Such a cover will have a defined mode of opening to release the liquid 54 when placed under pressure or impacted by the tip 38 of the swab 3, for example it may be formed with lines of weakness along which the cover can rupture or it may be designed as a sealed flap that can be forced to open about a hinge.

FIG. 6 shows the swab 3 inserted into the cassette 2 to its maximum extent. This is determined by the grip 36 abutting the external surface of the cassette 2 around the mouth 28 of the passage 26. More specifically, in the illustrated embodiment, the collar 42 of the grip 36 lodges in the recess 44 around the mouth 28 of the passage 26. Preferably, the tip 38 is then just touching or close to the opposite wall of the vial reservoir 20, which prevents the user applying excessive force on the swab 3 that could crush its tip 38. In alternative embodiments, the shaft 35 of the swab 3 is made slightly longer so that the grip 36 can still move forwards a short distance when the tip 38 is pressed against the opposite wall of the vial reservoir 20. This causes the shaft 35 to buckle slightly and to be deflected laterally, creating a tear in the seal 22 that can assist the escape of liquid 54 from the vial.

Preferably, when the swab 3 is fully inserted into the cassette 2, a substantial proportion of the head 40 is submerged in the liquid 54. The vial 6 is preferably filled with liquid 54 to a level such that the seal 22 is pierced below the surface of the liquid 54, whereby the liquid 54 will naturally flow under gravity through the resulting opening into the volume 32. The submerged head 40 will also displace liquid through the opening.

The user may turn the grip 36 to rotate the head 40 within the vial 6, which brings more areas of the head 40 into contact with the liquid 54. The relative movement between the surface of the head 40 and the liquid 54 also encourages the transfer of the sample from the head 40 to the liquid 54. In some embodiments of the invention, the vial 6 may be provided with ribs or other inward projections from the vial reservoir 20, which are configured to rub against the head 40 and further encourage the transfer of the sample into the liquid 54.

Figure 7:
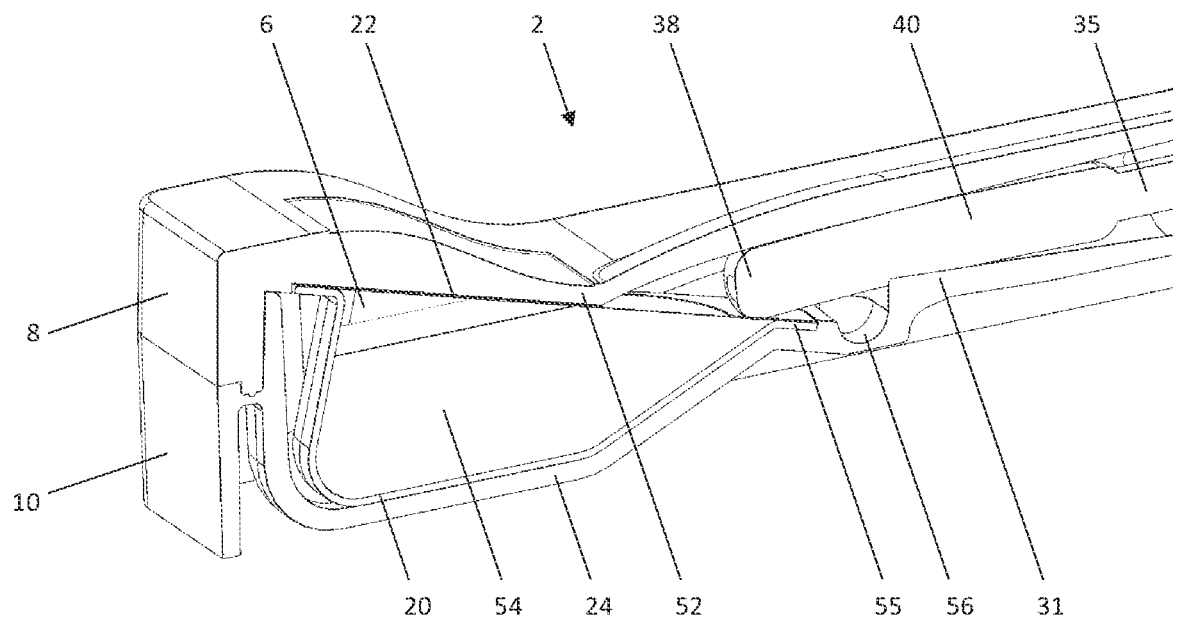
FIG. 7 is a partial, perspective, longitudinal cross-section through the distal end of the test kit of FIG. 1.
Figure 8:
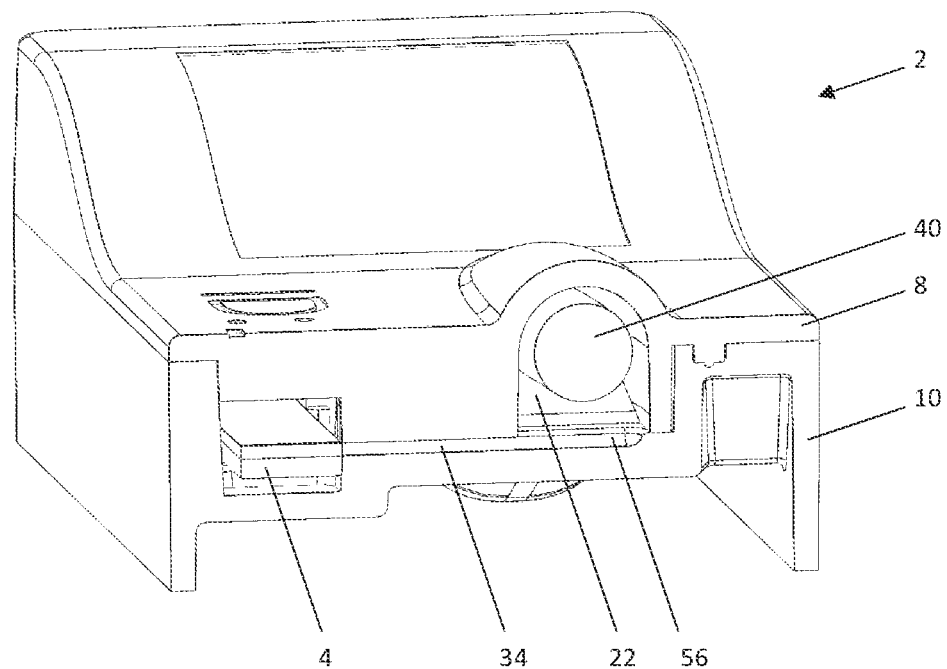
FIG. 8 is a perspective, transverse cross-section through the distal end of the test kit of FIG. 1.

As seen in FIG. 7, liquid 54 that escapes from the vial 6 flows over the rim 55 of the vial 6 into a well 56 in the lower half of the volume 32. The conduit 34 is configured to transport the liquid 54—now containing a part of the sample—from the well 56 to the test strip 4. In some embodiments, the conduit 34 may be of small cross section in order that the liquid does not flow freely and flood the test strip 4; its rate of transport through the conduit 34 being controlled by capillary forces. In such cases, the surface texture and/or material of the conduit 34 may be selected—for example, by applying a coating—to ensure that suitable capillary forces exist. In other areas of the test kit, for example where respective surfaces of the upper and lower halves 8,10 are in face-to-face contact, the surface texture and/or material may be selected to reduce capillary forces that might encourage the migration of liquid along the surfaces.

Provided the cassette 2 is generally orientated such that liquid can flow from the vial 6, collect in the well 56 and flow from there towards the test strip 4, successful operation of the test kit is not particularly sensitive to the orientation. Therefore it is suitable for hand-held use, i.e. with the cassette 2 being held in one hand and the swab 3 being inserted using the other hand. Embodiments of the invention that use capillary forces, rather than gravitational flow, to transport the liquid 54 through the conduit 32 may be even less sensitive to orientation.

Additional liquid may be encouraged to flow from the vial 6 into the well 56 by the user withdrawing the head 40 of the swab 3 from the vial 6. The withdrawing head 40 tends to draw liquid 54 over the rim 55 and into the well 56. As seen in FIG. 7, the constriction 31 in the passage 26 proximally of the well 56 squeezes the head 40 when the swab 3 is withdrawn. As the head passes a distal edge 58 of the constriction 31, some of liquid 54—now containing a portion of the sample—is squeezed or scraped from the head 40 and flows into the well 56. Instead of the illustrated constriction extending around the whole of the passage 26, a convex portion could be provided in just the lower half of the passage 26, to form an edge 58 that performs a similar function. As seen in FIGS. 5 and 6, the upper wall 52 of the vial chamber 24 may also exert pressure on the upper side of the head 40, which scrapes and/or squeezes liquid 54 containing a portion of the sample from the head 40 as the head 40 is inserted or withdrawn. In this case, the liquid 54 removed from the head 40 will be captured in the vial 6.

Withdrawal of the swab 3 from the cassette 2 is limited by the abutment of the outward projection 46 of the swab 3 with the inward projections 48 of the passage 26. Because of the cone shape of the outward projection 46 and the wedge shape of the inward projections 48, they can pass one another when sufficient force is applied when the swab 3 is moving in the distal direction but they cannot pass one another when the swab 3 is moving in the proximal direction. To ensure good transfer of sample from the head 40 to the liquid 54 and good displacement of the liquid 54 into the well 56, the user preferably moves the head 40 into and out of the vial 6 several times, within limits set in the proximal direction by the inward and outward projections 46,48 and in the distal direction by the abutment of the grip 36 against the cassette 2 around the mouth 28 of the passage 26. Each such "piston" action may displace some liquid 54 into the well 56 when the head 40 is pushed into the vial 6 and draw more liquid 54 into the well 56 when the head 40 is pulled out of the vial 6. It also functions to achieve good mixing between the sample and the liquid 54 within the vial, ensuring a homogenous mixture.

When the user has finished transferring the sample, they preferably insert the swab 3 to its most distal position so that the collar 42 of the grip 36 fits into the recess 44 around the mouth 28 of the passage 26. This closes the mouth 28 to prevent or reduce the subsequent leakage of liquid 54 from the cassette 2 via the passage 26. In this most distal position of the swab 3, the aforementioned outward projection 46 from the shaft 35 engages with the constriction 31 to provide an additional seal that prevents or reduces the flow of liquid from the volume 32 into the straight portion 29 of the passage 26. In other embodiments of the invention, a plug that seals against the constriction 31 at the most distal position of the swab could be provided as a separate feature from the outward projection 46 that resists initial insertion and prevents withdrawal of the swab 3. In other words, the plug and the outward projection 46 could be formed as discrete elements at different positions along the shaft 35. Alternatively, instead of such a plug feature, the shaft 35 could be provided with a thin, radial fin (not illustrated), which can seal around the shaft 35 at any position of the swab 3 along the passage 26, while being able to flex to permit the forward or backward movement of the swab 3 along the passage 26.

After a suitable delay to allow time for the liquid 54 to be transported along the test strip 4 and the chromatographic assay to be completed, the user can read the result of the test by inspecting the lines of the test strip 4 through the window 16. Then the cassette 2, including the test strip 4, vial 6 and swab 3 can be disposed of safely as a single, sealed unit.

Figure 9:
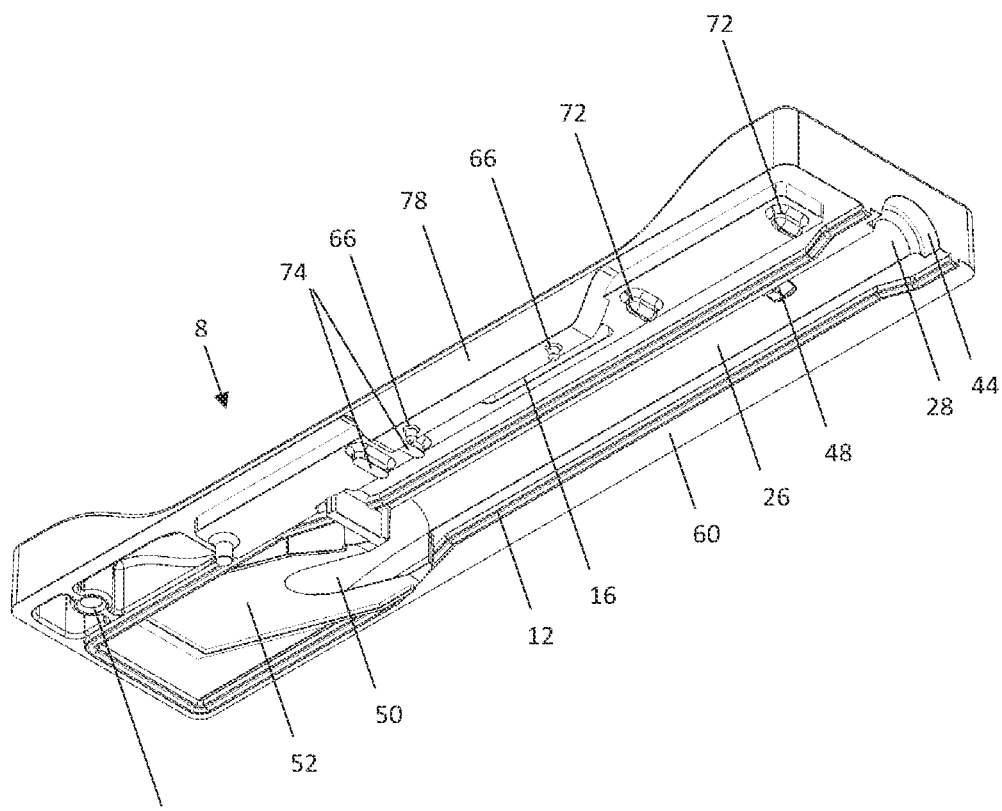
FIG. 9 is a perspective view, from below, of the upper half of the cassette of FIG. 1.
Figure 10:
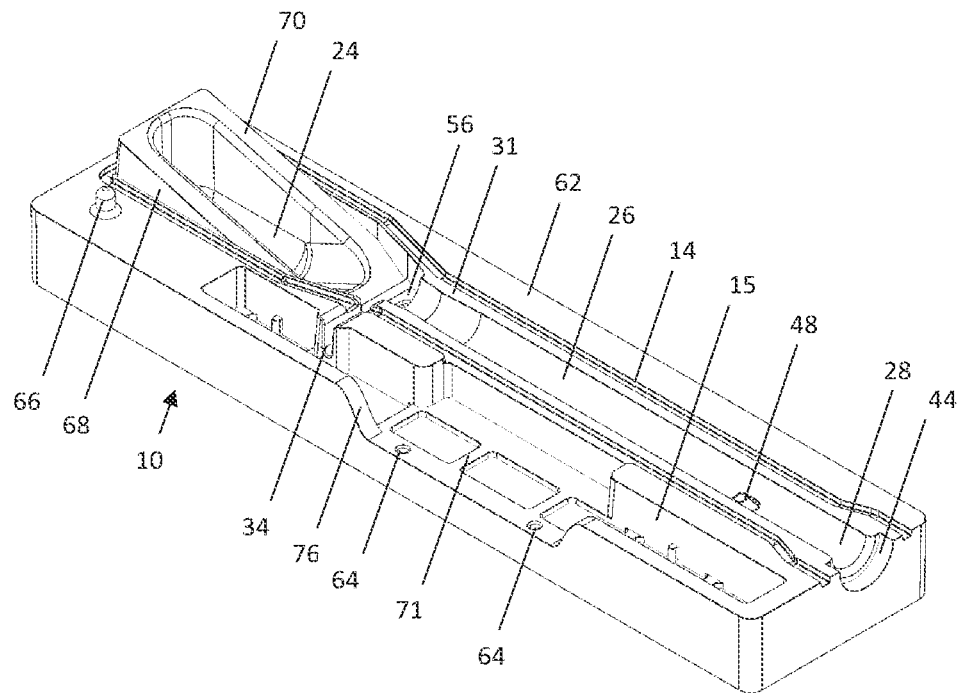
FIG. 10 is a perspective view, from above, of the lower half of the cassette of FIG. 1.

FIGS. 9 and 10 show more detail of the respective opposing faces 60,62 of the upper and lower halves 8,10 of the cassette 2. Although complex in design, each half 8,10 can be formed by injection moulding in a two-part mould from a plastics material such as polypropylene. The faces 60,62 are provided with mutually facing negative location features 64 (e.g. holes or recesses) and positive location features 66 (e.g. studs or pegs) that fit together to ensure the correct alignment of the two halves 8,10.

It may be seen than the lower sealing feature 14 takes the form of a groove that extends around the passage 26 and the vial chamber 24, while the upper sealing feature 12 takes the form of a complementary rib. The two sealing features 12,14 may be joined to one another in a liquid-tight manner, e.g. by ultrasonic welding or press-fitting, to prevent leakage of liquid from the passage 26 along the interface between the upper and lower halves 8,10, except where permitted by the capillary conduit 34.

The lower cassette half 10 comprises an upstanding boss 68, in which the vial chamber 24 is formed. The boss 68 further provides an inclined, planar seat 70 for the rim 55 of the vial 6, while the upper cassette half 8 provides the inclined, planar upper wall 52 of the vial chamber 54 that clamps the vial 6 in place after assembly.

The strip chamber 15 in the lower cassette half 10 supports the test strip 4 at a low level in the cassette 2, approximately level with the bottom of the well 56. The strip 4 rests on a series of transverse bars 71, which minimize contact with the underlying surface to prevent the longitudinal transfer of liquid by capillary action between the strip 4 and the surface, rather than through the strip itself. The upper cassette half 8 comprises securing bosses 72, which project into the proximal end of the strip chamber 15, downstream of the window 16 to clamp the test strip 4 in place. The upper cassette half 8 may further comprise at least one metering boss 74, which projects into the strip chamber 15 upstream of the window 16 to exert pressure on the test strip 4 and regulate the rate of transport of liquid from the conduit 34 along it. A side wall of the lower half 10 is provided with a moulded "cut-out" 76 down to the level of the test strip 4, which facilitates the automated placement of the test strip 4 in the strip chamber 15 during assembly of the cassette 2. The cut-out 76 is closed by a corresponding flange 78 on the upper cassette half 10.

FIGS. 11 to 16 illustrate further examples of test kits that embody the present invention. To the extent that they operate in the same way as the first embodiment, the same reference numerals are used and not all the details will be described again. In each case, the mounting of the test strip 4 in the cassette 2 is substantially the same as in the first embodiment.

Figure 11:
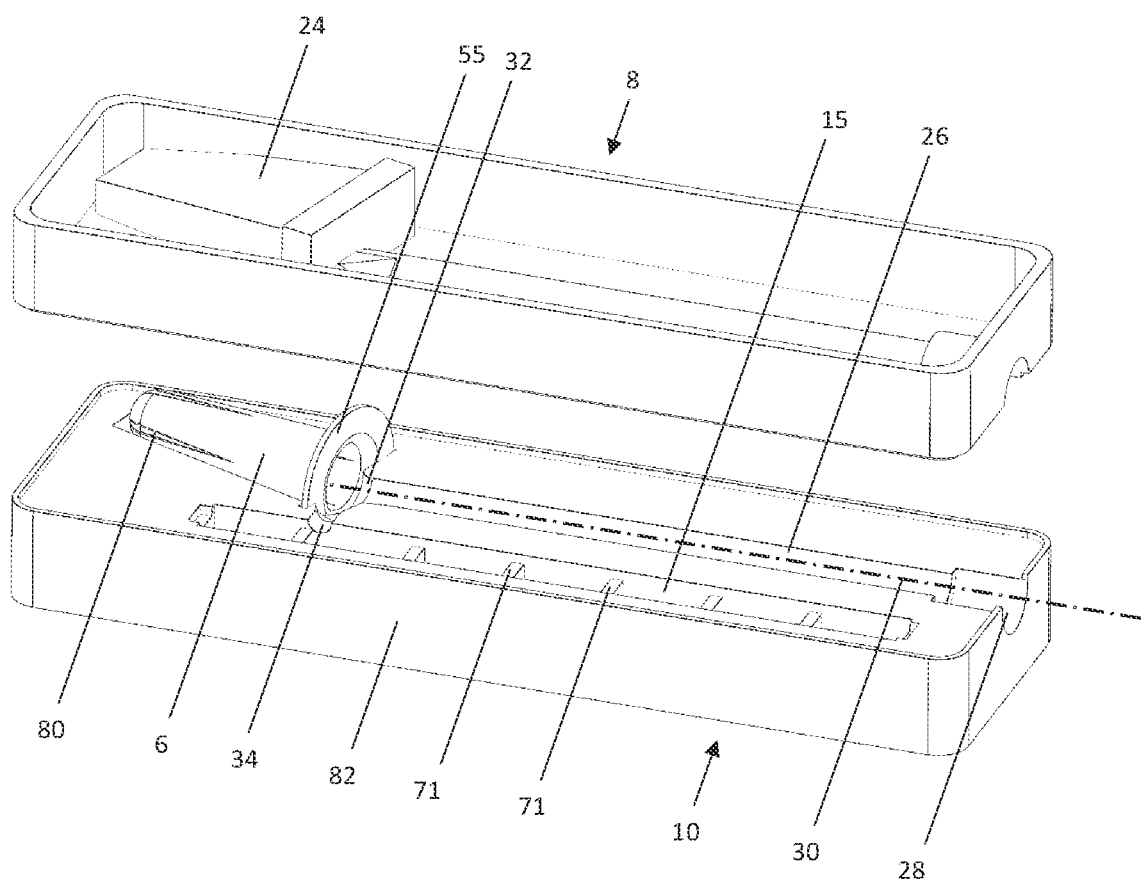
FIG. 11 is a perspective view, from above, of the cassette of a second embodiment of the invention, with the upper and lower halves separated.

FIG. 11 illustrates the cassette 2 of a test kit according to a second embodiment of the invention. As in the first embodiment, the cassette 2 is formed by assembling an upper half 8 with a lower half 10. The upper and lower halves 8,10 come together to form a longitudinal passage 26, which extends from a mouth 28 at the exterior of the cassette 2 to a distal end adjacent to a vial chamber 24. A vial 6 contains a liquid buffer solution and is closed by a seal (not illustrated), such as a layer of foil. A strip chamber 15 in the lower half 10 of the cassette extends longitudinally, generally parallel to the passage 26, and comprises transverse bars 71 on which a test strip (not illustrated) may rest. A short conduit 34 provides fluid communication between the distal end of the passage 26 and the strip chamber 15. On assembly of the cassette 2, the upper and lower halves 8,10 may be brought together and mutually attached to secure the vial 6 in the vial chamber 24 and a test strip in the strip chamber 15.

The second embodiment differs from the first embodiment in that the passage 26 is straight along its entire length. The vial 6 comprises a generally conical vial reservoir 20, which is disposed relative to the passage 26 such that when a swab is inserted along the axis 30 of the passage 26, a head of the swab will enter the vial 6 and contact a wall of the vial reservoir 20 at an oblique angle. Further movement of the swab into the passage 26 will create pressure between the head of the swab and the vial reservoir 20, causing the path of the head to be deflected away from the axis 30 as a tip of the swab approaches the distal end of the vial 6. The swab is not illustrated in FIG. 11 but may be similar to the swab 3 of FIG. 1 (optionally omitting the outward projection 46).

The mouth 28 of the passage 26 may be surrounded by a recess 44, which performs the same function as in the first embodiment.

The vial 6 comprises a rim 55, which assists with locating the vial 6 in the vial chamber 24. The vial rim 55 also provides a planar seat for the seal (not illustrated). The vial 6 may be orientated such that the plane of rim 55 (and hence of the seal) is at an oblique angle relative to the axis 30 of the passage 26. As in the first embodiment, the oblique angle of penetration assists the tip of the swab to form a tear in the seal instead of a neat hole that may be filled by the head and make it more difficult for liquid to flow from the vial 6 into the distal end of the passage 26. The oblique orientation of the vial 6 provides the further advantage of increasing the angle of contact between the head of the swab and the wall of the vial reservoir 20. The vial 6 further comprises a plurality of inward projections 80 from the internal surface of the vial reservoir 20, with the head of the swab may make contact when received in the vial chamber. Preferably, as the tip of the swab approaches the distal end of the vial 6, the head will be squeezed between all of the inward projections 80, then, by rotating the swab within the passage 26, a user can scrape the head against the inward projections 80 to encourage the transfer of sample from the head into the liquid.

As in the first embodiment, once the seal of the vial 6 has been penetrated, liquid carrying components of the sample can flow from the vial 6, past the head of the swab and into the distal end of the passage 26. Insertion of the head into the vial 6 may displace liquid from the vial and withdrawal of the head out of the vial 6 may further draw liquid from the vial into the distal end of the passage 26. This action may be repeated to ensure good mixing of the sample in the liquid and the transfer of a good quantity of liquid into the passage 26.

In this embodiment, the conduit 34 is not aligned with the base of the distal end of the passage 26 but is substantially at the level of the axis 30, therefore liquid pooling in the passage 26 is not immediately drawn by gravity into the conduit 34. The user may turn the cassette 2 through roughly 90° about the axis 30 so that the front face 82 visible in FIG. 11 is tilted generally downwards. The cassette 2 may be put down with the front face 82 resting on a flat surface or may continue to be held in the hand. This action causes the liquid in the distal end of the passage 26 to flow to the mouth of the conduit 34, from where it is transported through the conduit 34 into the distal end of the strip chamber 15. There the liquid carrying the sample is brought into contact with the test strip for a chromatographic assay to be performed. A window in the upper half 8 of the cassette (not visible in FIG. 11) allows the user to see a region of the test strip that comprises lines capable of indicating the outcome of the assay.

As already noted, the vial 6 illustrated in FIG. 11 has a substantially conical shape. This provides it with rotational symmetry, which may make the handling of the vial 6 simpler during its manufacture, filling with liquid and placement in the vial chamber 24. However, it is not essential because the vial 6 does not need to rotate during use of the test kit. Therefore, the vial 6 may have an alternative, non-symmetric shape with a specific internal side wall that is designed to be engaged by the head of the swab.

Figure 12:
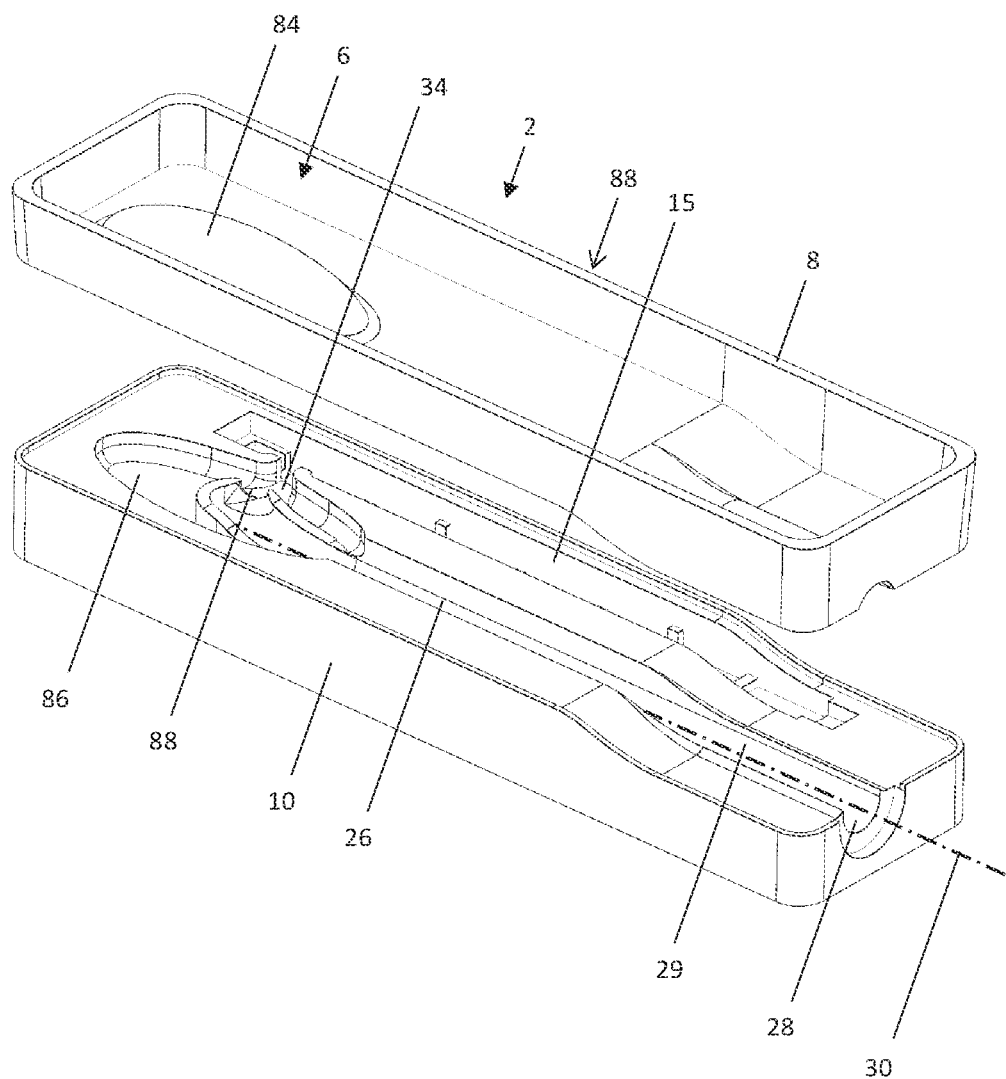
FIG. 12 is a perspective view, from above, of the cassette of a third embodiment of the invention, with the upper and lower halves separated.

FIG. 12 illustrates the cassette 2 of a test kit according to a third embodiment of the invention. This design has the advantage that the upper half 8 of the cassette 2 is simple enough to be manufactured by vacuum forming as an alternative to, for example, injection moulding. This embodiment differs from the preceding ones in that the vial 6 is not formed as a discrete component received in a chamber in the cassette 2. Instead, a dome 84 in the upper cassette half 8 serves as the vial reservoir 20. In a preliminary process, with the upper cassette half 8 held in an inverted orientation compared with FIG. 12, the vial 6 will be filled with the desired volume of liquid, then the mouth of the vial 6 may be closed by a planar seal (not visible in FIG. 12). As in the first embodiment, a passage 26 is formed between the upper and lower cassette halves 8,10. It extends longitudinally from an external mouth 28, initially along a straight portion 29, to reach a distal end that curves upwards and away from the axis 30 of the straight portion 29 towards the seal of the vial 6. In this embodiment, the plane of the seal is substantially parallel to the axis 30 so the distal end of the swab (not illustrated) needs to be quite flexible in order for its tip to follow the curved wall 50 of the passage and approach the seal at a sufficiently steep angle to penetrate it.

Once the seal has been breached, liquid will flow past the head of the swab and fall into a collection chamber 86 formed in the lower cassette half 10, which surrounds the distal end of the passage. Some of the released liquid may also fall into the distal end of the passage itself. When sufficient liquid now mixed with the sample from the swab—has accumulated in the collection chamber 86, the user may turn the cassette 2 through roughly 90° about the axis 30 so that the rear face 82 indicated in FIG. 12 is tilted generally downwards. This causes any liquid that has fallen into the distal end of the passage to drain through an opening 88 into the collection chamber 86. At the same time, the liquid in the collection chamber 86 flows to the mouth of the conduit 34, from where it is transported through the conduit 34 into the distal end of the strip chamber 15, to be applied to the distal end of a test strip (not illustrated) as previously described.

Figure 13:
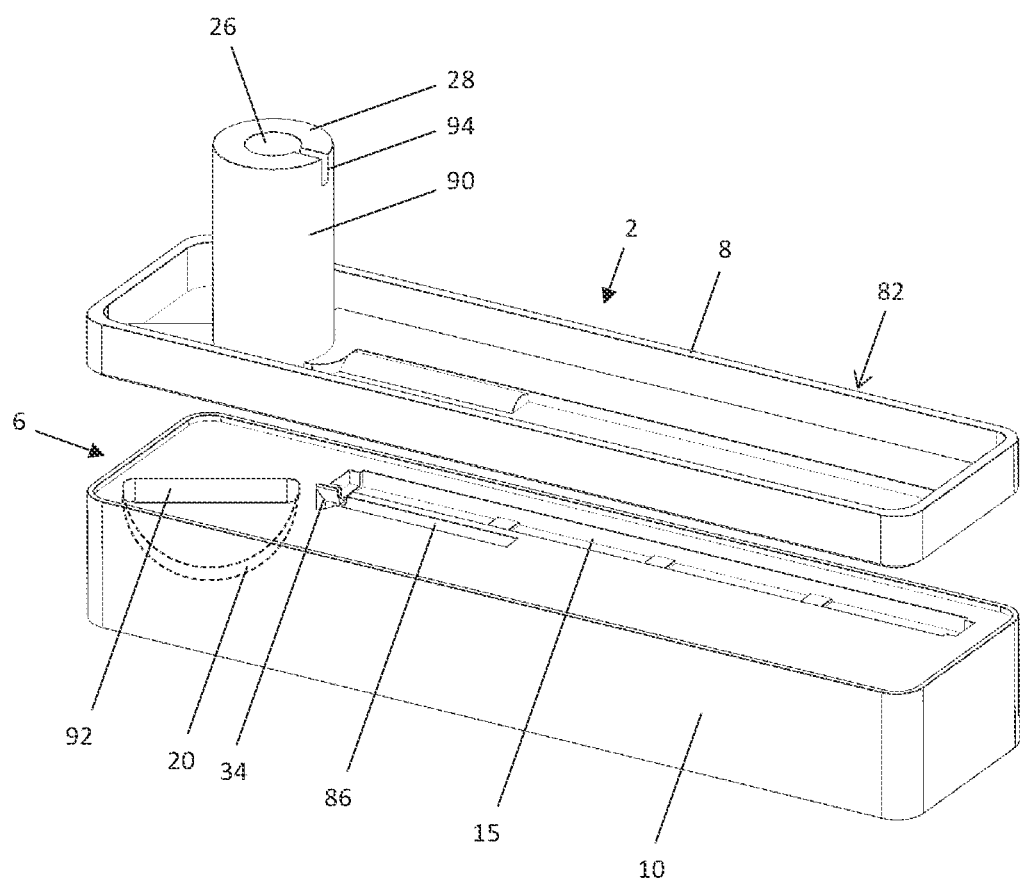
FIG. 13 is a perspective view, from above, of the cassette of a fourth embodiment of the invention, with the upper and lower halves separated.

FIG. 13 illustrates the cassette 2 of a test kit according to a fourth embodiment of the invention. Its most significant difference from the preceding embodiments is that, when the cassette 2 rests on a horizontal surface, the test strip in the strip cavity 15 extends longitudinally and horizontally as before but the swab is inserted through a passage 26 that extends vertically through a boss 90 from an external mouth 28 to a distal end adjacent to a vial 6. As in the third embodiment, the vial 6 is not formed as a discrete component received in a chamber in the cassette 2. Instead, a generally semi-circular recess 92 in the lower cassette half 10 serves as the vial reservoir 20 and its upper side may be closed by a planar seal (not shown) seated on the upper face 62 of the lower half 10. The passage 26 is aligned with a curved internal wall of the vial 6 so that, as a swab (not shown) is inserted along the passage 26, the head of the swab makes contact with the curved wall and is deflected around the curve. The wall exerts pressure on the head of the swab, which encourages the transfer of sample from the head into the liquid in the vial 6. The user may rotate the swab within the vial 6 and may repeat the steps of inserting and partially withdrawing it to increase the transfer of sample. The user may then turn the cassette 2 about its longitudinal axis so that the rear face 82 indicated in FIG. 13 is tilted generally downwards. This causes liquid to drain from the vial 6 into the distal end of the passage and to accumulate in a collection chamber 86, which in the illustrated embodiment is in the form of a cylinder lying parallel to the strip chamber 15. A narrow conduit 34 provides fluid communication between the collection chamber 86 and the strip chamber 15, through which the liquid is transported at a controlled rate, to be applied to the distal end of a test strip (not illustrated) as previously described.

The vertical passage 26 in the fourth embodiment means that when a swab is inserted along the passage 26 it approaches the vial seal 22 at a steep angle, making it more certain that the tip of the swab will pierce the seal 22 rather than deflecting off it. It is not essential that the passage 26 should be perpendicular to the plane of the seal 22: it can easily be envisaged that it could be inclined so that the swab approaches the seal 22 at an oblique angle, though this might require the upper half 8 to be formed in a more complex mould. A disadvantage of this embodiment is that the vertically extending boss 90 makes it less compact than the preceding ones. The passage 26 may be made shorter but then, after use of the test kit, the proximal end of the swab will be left protruding from it. The swab may be removed for separate disposal but it is preferred to retain the head, still carrying some of the sample, inside the cassette after use.

Therefore the swab may be provided with a weak point (not illustrated) at a suitable position along its length, which makes it easy to snap off the proximal end of the swab after use, leaving the distal end in the cassette 2. The boss 90 may be provided with a notch 94 intersecting the mouth 28 of the passage 26, in which the shaft of the swab can be lodged adjacent to its weak point to facilitate snapping the swab into two pieces.

FIGS. 14 to 17 illustrate the cassette 2 of a test kit according to a fifth embodiment of the invention. It has some similarity to the fourth embodiment, incorporating the variation just described, in which the mouth 28 of the passage 26 is in a boss 90 on the upper cassette half 8. Again, a recess 92 in the lower cassette half 10 serves as the vial reservoir 20 and its upper opening may be closed by a planar seal 22 seated on the upper face 62 of the lower half 10. Alternatively, the vial 6 could be provided as a discrete element received in the recess 92. A distal end of the passage 26 is above the vial 6 and is oriented at an inclined angle with respect to the seal 22.

Figure 16:
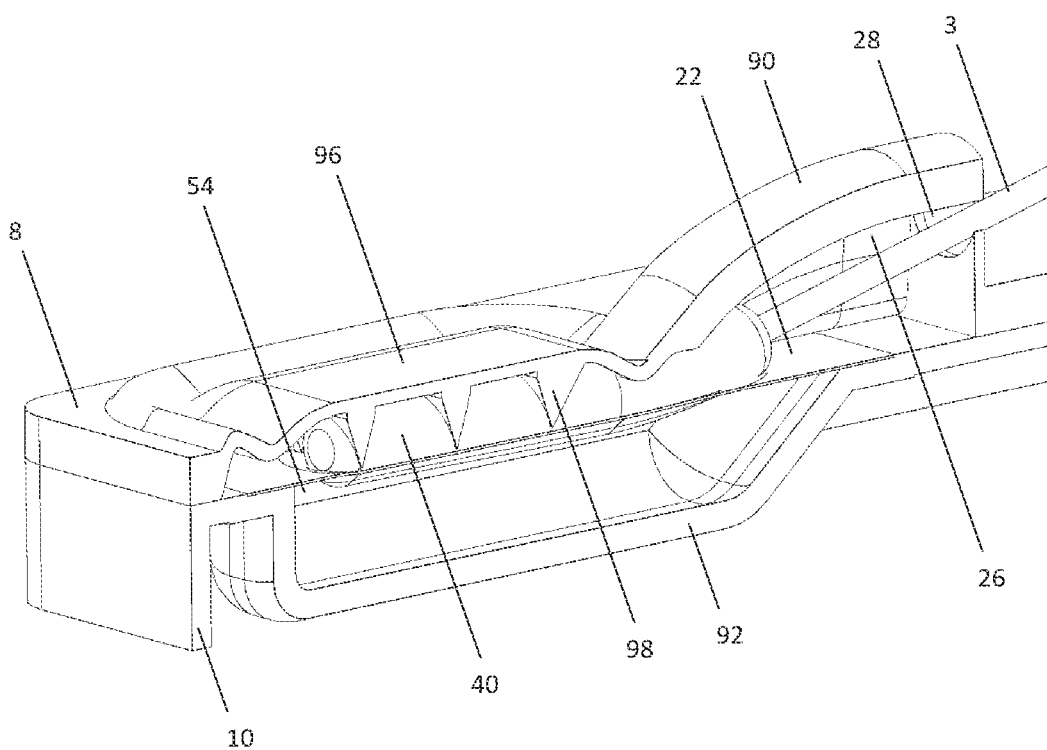
FIGS. 16 and 17 are sectional, perspective views, showing a detail of the fifth embodiment of the invention before and after the button is pressed.
Figure 17:
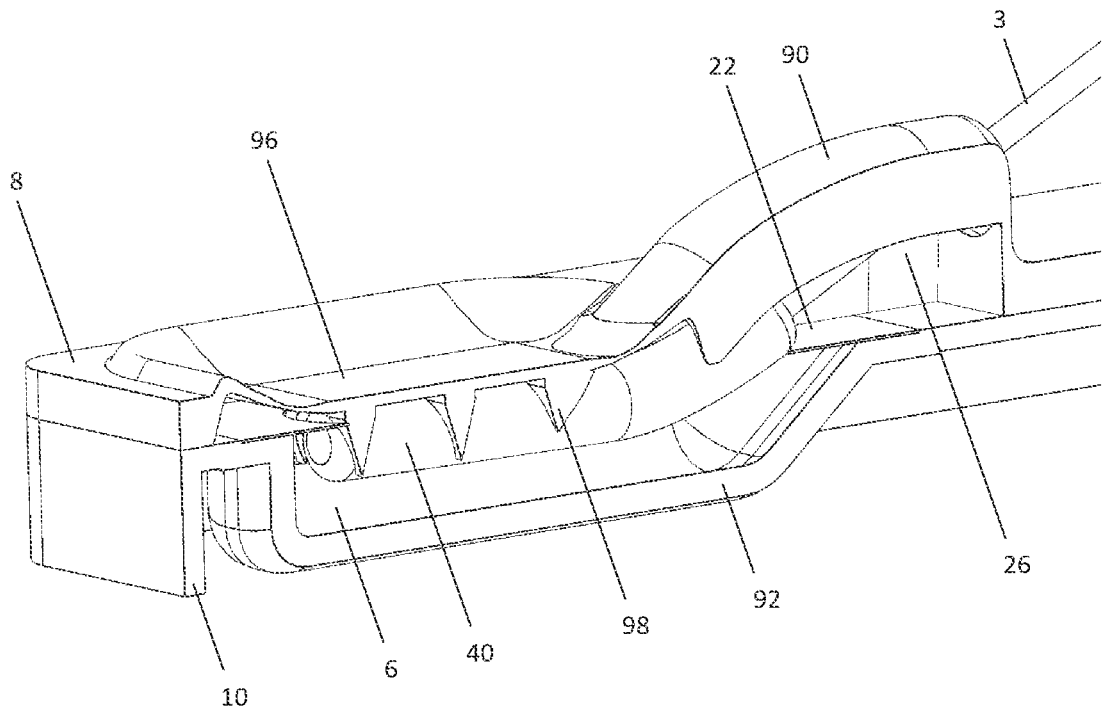

The most distinctive feature of this embodiment is a button 96 formed as a flexible member that protrudes from the top of the upper cassette half 8 above the vial 6. The underside of the button 96 is provided with a number of blades 98, such that by pressing down on the button 96, a user can cause the blades 98 to cut, tear or rupture the seal 22 covering the vial 6. In the illustrated embodiment, each of the blades 98 comprises a generally semi-circular rib that can fit around the head 40 of a swab 3, the two ends of each rib terminating in sharp points for piercing the seal 22. It is not essential for the blades 98 to be particularly sharp, provided they are capable of breaching the seal 22. This embodiment does not rely on the swab 3 itself to have a shape and rigidity suitable for penetrating the seal 22, or to be inserted at a steep enough angle to penetrate the seal 22. The user first inserts the swab 3 along the passage 26 until its head lies above the seal 22 and below the button 96, cradled by the blades 98, as shown in FIG. 16. The user then presses the button 96, both to rupture the seal 22 with the points of the blades 98 and simultaneously to push the head of the swab into the vial 6, as shown in FIG. 17.

In some alternative embodiments, the blades 98 could be omitted, whereby the function of the button 96 is only to force the tip of the swab through the seal at a favourable angle. In other embodiments, the user may first push the button 96 to create a hole in the seal 22, then insert the swab 3 along the passage 26 so that the head 40 of the swab 3 can enter the vial 6 through the pre-formed hole. In variants of these embodiments, an additional or alternative function of the button 96 is to displace liquid from the vial 6 when it is pressed.

Figure 14:
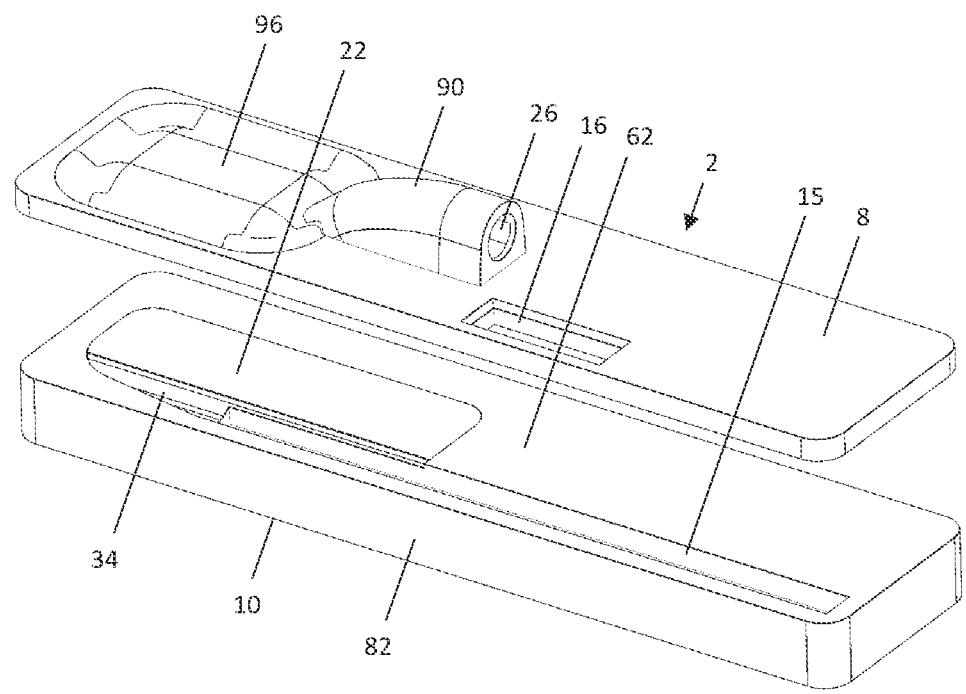
FIG. 14 is a perspective view, from above, of the cassette of a fifth embodiment of the invention, with the upper and lower halves separated.
Figure 15:
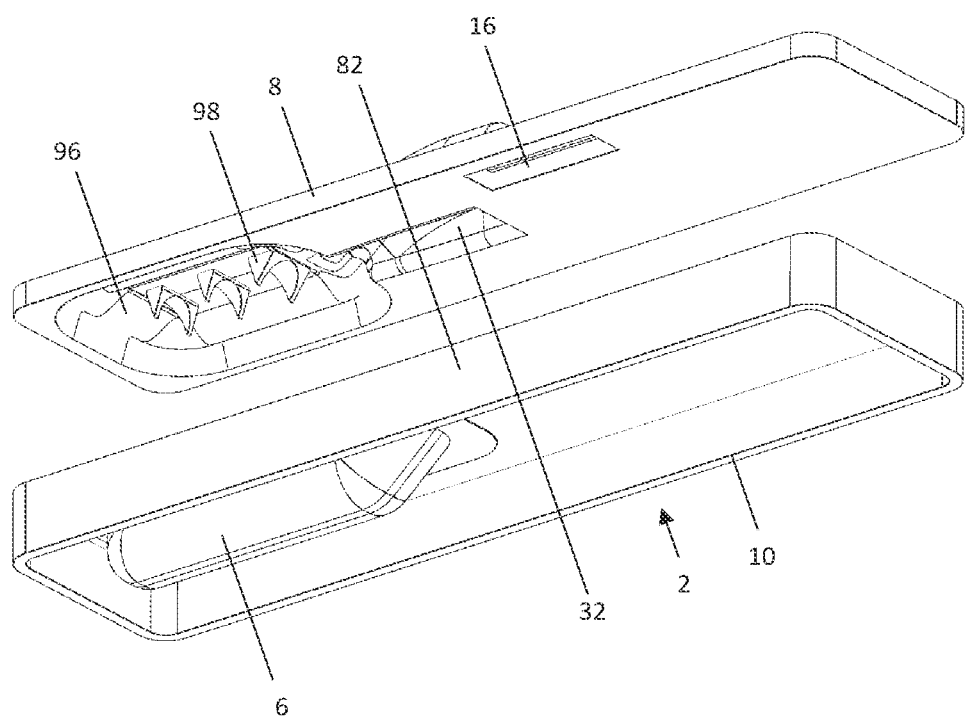
FIG. 15 is a perspective view, from below, of the cassette of the fifth embodiment of the invention, with the upper and lower halves separated.

Once the head of the swab is inside the vial 6, it may be rotated, agitated or rubbed against the base of the vial 6 and the blades 98 to encourage the transfer of sample into the liquid 54. When a sufficient quantity of the sample is judged to have been transferred, the user may turn the cassette 2 about its longitudinal axis so that the front face 82 visible in FIGS. 14 and 15 is tilted generally downwards. This causes liquid 54 to drain from the vial 6, via a conduit 34, into the distal end of the strip chamber 15. As in the other embodiments, the liquid 54 is then conducted along the test strip (not illustrated) by capillary action to permit a chromatographic assay to be performed. Lines that appear on the strip to indicate the result of the test may be viewed through a window 16 in the upper cassette half 8.

Each of the illustrated embodiments of the invention comprises a single test strip 4. However, it can easily be envisaged that a single cassette 2 could comprise two or more test strips 4, each used for detecting the presence of a different substance in the sample (or for detecting the same substance as a way of verifying the validity of the result of the test). It will generally be convenient for the multiple test strips 4 to be arranged in parallel. They may be disposed on one side or on both sides of the passage 26. Liquid containing the sample may be delivered from the vial 6 to more than one test strip 4 via a common conduit 34. Alternatively, each test strip 4 may be supplied by a separate conduit 34.

The invention claimed is:

1. A lateral flow test kit comprising a cassette and a swab, wherein:
   the cassette comprises:
      a vial of liquid;
      a test strip;
      a passage having a proximal end open to an exterior of the cassette and a distal end adjacent to the vial; and
      a conduit having an inlet in communication with the distal end of the passage and an outlet adjacent to the test strip;
   the vial comprises a seal for retaining the liquid in the vial;
   the distal end of the passage is oriented towards the seal;
   the swab comprises a head for carrying a sample to be tested; and
   the cassette and the swab are configured such that the swab can be inserted along the passage towards the distal end to cause the head of the swab to enter the vial, thereby allowing liquid from the vial to flow past the head into the distal end of the passage,
   wherein the seal is generally planar and the orientation of the distal end of the passage is at an oblique angle with respect to the plane of the seal.

2. The kit according to claim 1, wherein the passage comprises a substantially straight portion that defines an axis, and wherein the distal end of the passage is curved or inclined with respect to the axis.

3. The kit according to claim 1, wherein the passage comprises a substantially straight portion that defines an axis, and wherein the plane of the seal is at an oblique angle with respect to the axis.

4. The kit according to claim 1, wherein the passage comprises a substantially straight portion that defines an axis, and wherein the vial comprises an internal surface for contact by the head of the swab, the internal surface being at an oblique angle with respect to the axis.

5. The kit according to claim 4, wherein the vial further comprises inward projections from the internal surface, which are configured to rub against the head of the swab when the swab is rotated in the vial.

6. The kit according to claim 1, wherein the passage comprises a substantially straight portion that defines an axis, and wherein the test strip is substantially parallel to the axis of the passage.

7. The kit according to claim 1, comprising at least one further test strip, which is in fluid communication with the distal end of the passage via the said conduit or via a further conduit.

8. The kit according to claim 1, wherein the cassette further comprises a well, which is open to the distal end of the passage for receiving liquid released from the vial; and wherein the inlet of the conduit opens into the well.

9. The kit according to claim 8, wherein the passage comprises a convex feature proximally of the well for applying pressure to the head of the swab when it is withdrawn past the convex feature.

10. The kit according to claim 9, wherein the swab comprises a plug for engagement with the convex feature of the passage to resist the flow of liquid from the well in a proximal direction along the passage.

11. The kit according to claim 8, wherein the well is configured to collect liquid from the vial in a first orientation of the cassette and to deliver the liquid into the conduit in a second orientation of the cassette.

12. The kit according to claim 1, wherein the conduit is a capillary tube.

13. The kit according to claim 1, wherein the passage and the swab comprise mutually engaging structures that resist distal movement of the swab past an intermediate position along the passage.

14. The kit according to claim 13, wherein the mutually engaging structures comprise at least one inward projection on the passage and at least one outward projection on the swab.

15. The kit according to claim 13, wherein the mutually engaging structures are shaped to prevent the swab being withdrawn fully from the passage.

16. The kit according to claim 1, wherein the swab comprises a shoulder that is too wide to enter a mouth of the passage, the swab having a length such that, when the shoulder abuts the cassette around the mouth of the passage, the head of the swab lies at least partially within the vial but a tip of the swab is not pressed against a wall of the vial.

17. The kit according to claim 1, wherein the swab comprises a shoulder that is too wide to enter a mouth of the passage, the swab having a length such that, when the shoulder abuts the cassette around the mouth of the passage, the head of the swab lies at least partially within the vial and a tip of the swab is pressed against a wall of the vial, causing a shaft of the swab to buckle.

18. The kit according to claim 1, wherein the swab comprises a shoulder that is configured to seal the mouth of the passage.

19. The kit according to claim 1, wherein the vial is a discrete component received in a chamber in the cassette.

20. The kit according to claim 1, wherein a tip of the swab is configured to penetrate the seal of the vial.

21. The kit according to claim 1, wherein the cassette further comprises a button, which is operable to break the seal of the vial and allow the head of the swab to enter the vial.

22. The kit according to claim 21, wherein pushing the button both breaks the seal and pushes the head of the swab into the vial.

\* \* \* \* \*